United States Patent
Kaytis et al.

(10) Patent No.: US 9,892,485 B2
(45) Date of Patent: Feb. 13, 2018

(54) SYSTEM AND METHOD FOR MESH DISTANCE BASED GEOMETRY DEFORMATION

(75) Inventors: Clay Kaytis, Burbank, CA (US); John Edgar Park, Burbank, CA (US); Gene Lee, Burbank, CA (US); Philippe Brochu, Burbank, CA (US); Hidetaka Yosumi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 709 days.

(21) Appl. No.: 12/420,014

(22) Filed: Apr. 7, 2009

(65) Prior Publication Data

US 2009/0251462 A1    Oct. 8, 2009

Related U.S. Application Data

(60) Provisional application No. 61/043,394, filed on Apr. 8, 2008.

(51) Int. Cl.
*G06T 15/00* (2011.01)
*G06T 3/40* (2006.01)

(52) U.S. Cl.
CPC ..................... *G06T 3/40* (2013.01)

(58) Field of Classification Search
CPC ....................................... G06T 3/40
USPC ........................... 345/606–640, 647
See application file for complete search history.

(56) References Cited

U.S. PATENT DOCUMENTS

| | | | |
|---|---|---|---|
| 6,526,173 B1 * | 2/2003 | Burns | H04N 19/46 375/E7.09 |
| 7,233,327 B2 * | 6/2007 | Isner | G06T 13/40 345/419 |
| 8,054,311 B1 * | 11/2011 | Sheffler et al. | 345/473 |
| 2002/0000996 A1 * | 1/2002 | Trika | G06T 13/00 345/629 |
| 2003/0038822 A1 * | 2/2003 | Raskar | 345/632 |
| 2005/0057569 A1 * | 3/2005 | Berger | G06T 13/40 345/473 |

(Continued)

OTHER PUBLICATIONS

J.P. Lewis et al. "Pose Space Deformation: A Unified Approach to Shape Interpolation and Skeleton-Driven Deformation." International Conference on Computer Graphics and Interactive Techniques. pp. 165-172 (2000).

*Primary Examiner* — Gregory J Tryder
*Assistant Examiner* — Michael Le
(74) *Attorney, Agent, or Firm* — Farjami & Farjami LLP

(57) ABSTRACT

A method of manipulating at least a portion of a character model into a pose involving a library data having a plurality of deformations, where each deformation is associated with index values of one or more distance measurement nodes. One or more distance measurement nodes are defined for the portion of the character model, wherein each distance measurement node comprises a number of points on a surface defined by the geometry of the character model, wherein the points are separated by a distance value. A particular pose is selected for the character model portion to establish an initial model by selecting values for the pose controls. For the particular pose, a value of the distance measurement nodes is determined. At least one deformation is selected from the library data based in the value of the distance measurement nodes and applied to the initial model to generate a deformed model.

12 Claims, 9 Drawing Sheets

(56) References Cited

U.S. PATENT DOCUMENTS

| | | | |
|---|---|---|---|
| 2006/0188143 A1* | 8/2006 | Strassenburg-Kleciak | ................ G01C 15/00 382/154 |
| 2007/0291050 A1* | 12/2007 | Bruderlin et al. | ............ 345/606 |
| 2008/0043042 A1* | 2/2008 | Bassett | ................... G06T 13/20 345/646 |
| 2008/0180448 A1* | 7/2008 | Anguelov | ............... G06T 13/40 345/475 |
| 2010/0009308 A1* | 1/2010 | Wen | ........................ A61C 7/08 433/24 |

* cited by examiner

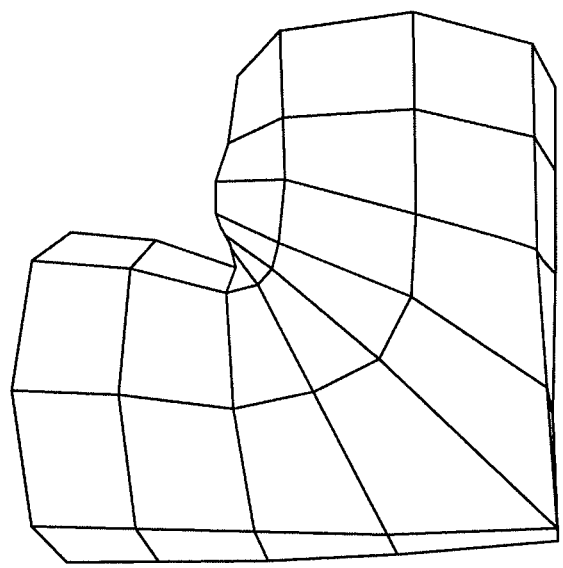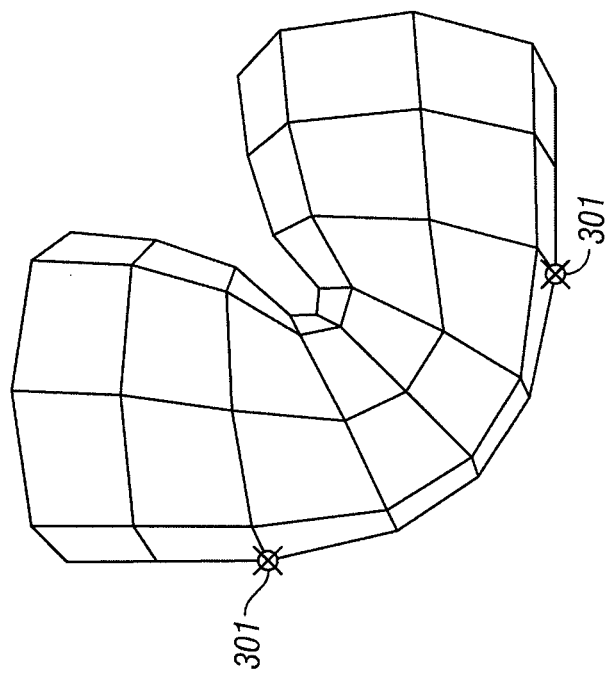
FIG. 4

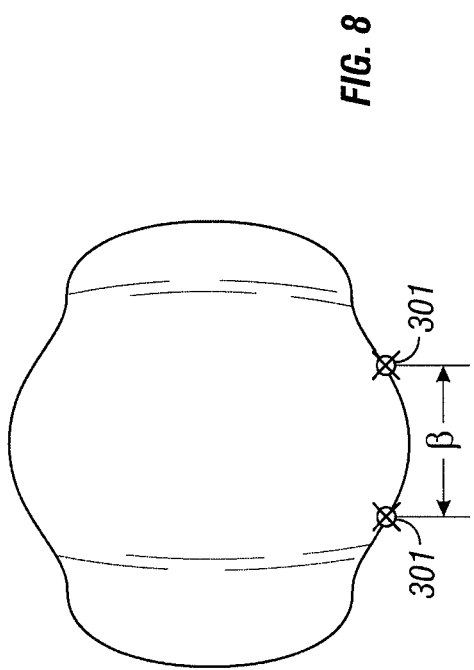
FIG. 8
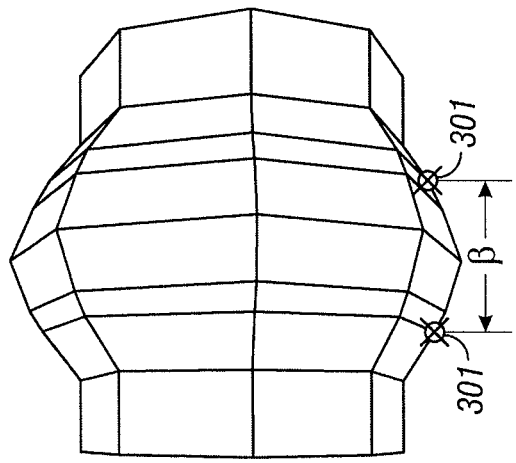
FIG. 6
FIG. 7
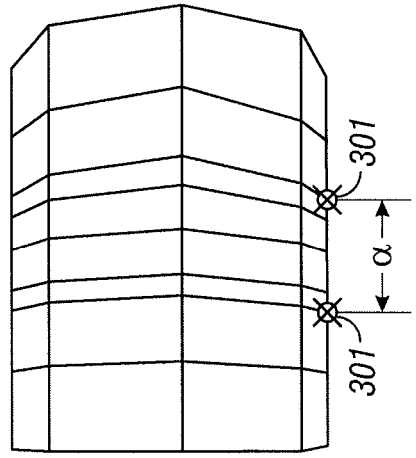

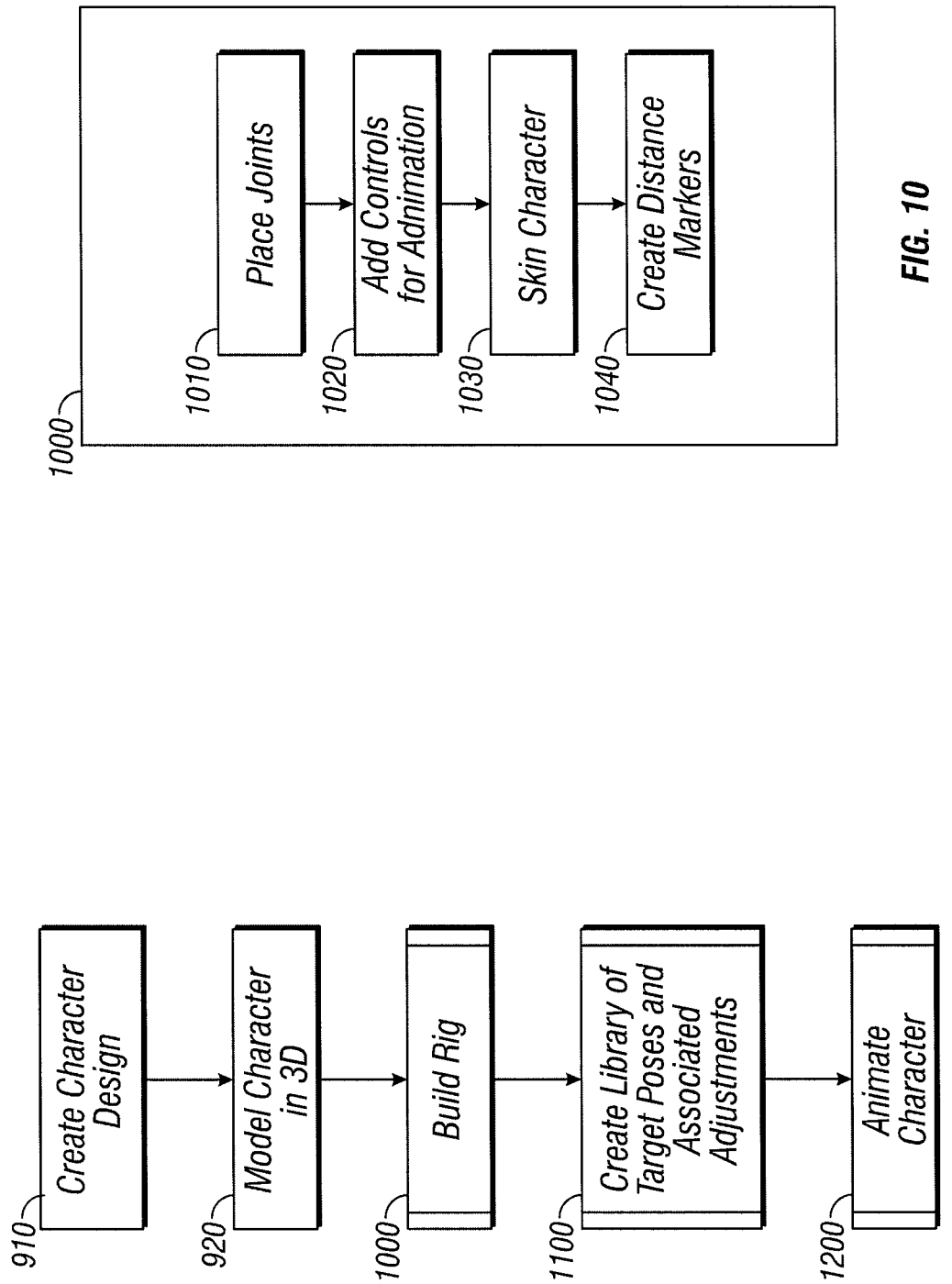

SYSTEM AND METHOD FOR MESH DISTANCE BASED GEOMETRY DEFORMATION

CROSS-REFERENCE TO RELATED APPLICATION

The present application claims priority under 35 U.S.C. § 119(e) to U.S. Provisional Application 61/043,394, filed on Apr. 8, 2008, and which is incorporated by reference in its entirety.

BACKGROUND

Field of the Invention

The present application relates to computer graphics and, more particularly, systems, methods, software and devices providing geometry deformation of computer generated animated characters.

Description of the Related Technology

Computer graphic images are created by mathematically modeling the interaction of light with a three dimensional scene from a given viewpoint. This process, called rendering, generates a two-dimensional or three-dimensional stereo image of the scene from the given viewpoint, and is analogous to taking a photograph of a real-world scene. Animated sequences are created by rendering a sequence of images of a scene as the scene is gradually changed over time.

Computer-generated animation of characters is accomplished by manipulating a three-dimensional model of a character into a series of bodily positions, or poses, over a sequence of frames. A character model is often extremely complex, having millions of surface elements and hundreds or thousands of attributes. Due to the complexity involved with animating such complex models, animation tools often rely on armatures and animation variables to define character animation.

A character model is typically constructed from a skeletal representation that is associated with "geometry" that can be visualized as a wire frame mesh associated with the skeletal representation. The skeletal or "stick figure" representation comprises a number of segments or "bones" linked by joints where the position of the bones and joints represent the character's pose, or bodily position. By moving the segments or "bones", which are the "sticks" of the "stick figure," the character can be manipulated into a desired pose.

The geometric model comprises multiple model components that represent, for example, layers of bone and tissue that give the character dimension. Model components are associated with the underlying skeletal representation so that the model moves, stretches and deforms as the skeletal segments change position. A character model is completed by applying texture to the surfaces of the geometric model. The textures represent skin, cloth, hair and the like that is visible when the character is rendered. Depending on the artistic goals of the animator, certain features such as hair and cloth may be separately animated (e.g., have their own segmented structure with geometry and texture) rather than simply applied as texture.

Once a model is defined, the animator controls the model's position in each frame of a film either directly or indirectly so as to create a desired visual representation of the character in a film. Although usually only the outer skin of the character is visible in a final video clip, the animator often only manipulates characters with the underlying character model. To achieve a desired artistic result, the computer model of a character is often extremely complex, having millions of surface elements and hundreds or thousands of attributes. Due to the complexity involved with animating such complex models, animation tools often define a subset of control points such as joints in the skeletal model that can be manipulated by the artist. The controlled joint motion is algorithmically translated by animation tools to movements and deformations of the geometric model.

SUMMARY OF CERTAIN INVENTIVE ASPECTS

In one embodiment, a method comprising modeling in an electronic device an object is disclosed. The object of the first embodiment is configurable into one of a plurality of different surface configurations, and the model of the first embodiment comprises least two of the plurality of different surface configurations of the object. Each of the surface configurations in the model is associated with an adjustment in the model. The method of the first embodiment includes a determining step to determine an adjustment for a surface configuration of the object that is not in the model, the determining step is based upon a blending of two or more of the adjustments in the model.

In one embodiment, a method of creating at least a portion of a character model is disclosed. A poseable character model portion comprising pose controls and geometry is created, wherein the geometry defines a surface of at least a portion of the character model. A particular pose for the character model portion to establish an initial model is selected by selecting values for the pose controls. For the particular pose, a number of point sets on the surface defined by the geometry is selected, wherein the point sets comprise two or more points separated by a distance value such that each sculpted pose is associated with a number of distance values. The initial character model portion to define a sculpted character model portion is sculpted. An adjustment describing a deviation between the initial model and the sculpted model at the particular pose is computed. The adjustment is associated with the number distance values for the particular pose.

In one embodiment, a computer-readable medium having stored thereon a plurality of instructions is disclosed. Computer device to perform an operation comprising a plurality of steps. The operation comprises providing an adjustment library comprising a plurality of adjustments, wherein each adjustment is associated with index values of a one or more distance measurement nodes. The operation comprises defining one or more distance measurement nodes for the portion of the character model, wherein each distance measurement node comprises a number of points on a surface defined by the geometry of the character model, wherein the points are separated by a distance value. The operation comprises selecting a particular pose for the character model portion to establish an initial model by selecting values for the pose controls, for the particular pose. The operation comprises determining a value of the distance measurement nodes. The operation comprises selecting at least one adjustment from the adjustment library based in the value of the distance measurement nodes. The operation comprises and applying the selected at least one adjustment to the initial model to generate a deformed mode.

In one embodiment means for animating a computer model comprising a processor configured to execute animation instructions are disclosed. The means comprise surface configuration data, the surface configuration data defining at least one relationship between surface locations on a character, and adjustment means for determining by the processor an adjustment set to be applied to the character at least partially on the basis of the surface configuration data.

In one embodiment, an electronic device is disclosed. The electronic device comprises surface configuration data of a posable character, a set of adjustments, wherein each of the adjustments is associated with a surface configuration datum of the surface configuration data, and an adjustment engine configured to determine an adjustment to apply based at least in part on the set of adjustments and the associated surface configuration data.

BRIEF DESCRIPTION OF THE DRAWINGS

FIG. 4 illustrates the geometric model or mesh of FIG. 3 after repositioning showing a comparison between before corrective deformation on the left and after corrective deformation on the right.

FIG. 6 illustrates geometric model/mesh representations of the model shown in FIG. 3 before (left) and after (right) corrective deformation after squashing.

FIG. 7 illustrates objects rendered from the geometric models shown on the left side of FIG. 6.

FIG. 8 illustrates objects rendered from the geometric models shown on the left side of FIG. 6.

FIG. 9 is a flowchart showing one embodiment of a process for the creation and animation of a character according to one embodiment.

FIG. 10 is a flowchart showing one embodiment of a process to build a rig process.

DETAILED DESCRIPTION OF CERTAIN INVENTIVE EMBODIMENTS

Figure 1:
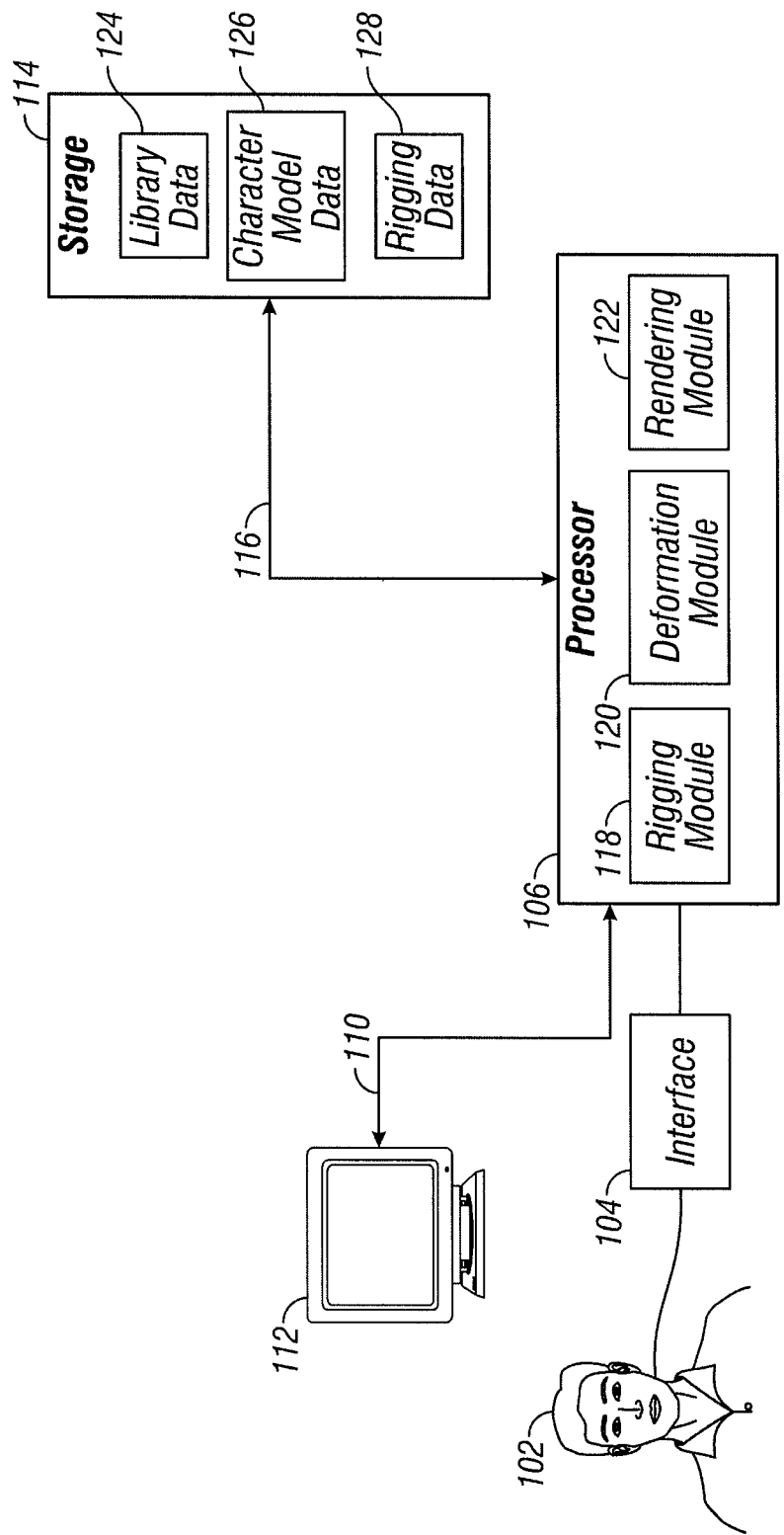
FIG. 1 is a block diagram of a computing environment that may be used in conjunction with inventive embodiments.

Using known processes, deformation of geometric models remains a challenge. Even simple motions such as an arm or leg bending are difficult to represent because the tissue volume, bulging, folding and distortion of the various model components often produce less than satisfactory results in the final visual representation. Good results are achieved with surface-based approaches that enable manipulation of points or features on the surface of a geometric model. Surface-based techniques interpolate to compute location of surface points that are not directly manipulated by the animator. Because they involve direct manipulation of what is very close to the final visual representation, these techniques are animator friendly. However, surface-based techniques are computationally expensive and time consuming for the animator as thousands of surface points exist in even a simple model. Accordingly, surface-based deformation techniques are not suitable for handling all deformation required to animate a character (the term "character" is used in this application as an example of a modeled object which may comprise an underlying bone structure and/or a visible skin structure, the term is intended to be used without loss of generality to discuss both anthropomorphic and non-anthropomorphic modeled objects).

Shape interpolation techniques, also called shape blending, multi-target morphing, and other names, is widely used in facial animation. A library of discrete facial positions is created and each position is refined by the animator by directly manipulating the shape into a desired form. Once a complete set is created, in-between interpolation of the coordinates can be computed to determine a shape for an arbitrary position for the model. Shape interpolation is primarily used for face models where the features are for the most part not bending due to the action of an underlying skeleton. Unfortunately, it is often difficult to accurately model skin that is bending under the action of an underlying skeleton by blending relatively few fixed skin conformations. A large number of discrete positions would be required to achieve artistically acceptable results in many cases.

Skeletal subspace deformation (SSD) is a class of techniques that rely on manipulation of the structure (skeleton) to simplify the control of the character model. SSD techniques use information about the skeletal position to inform processes associated with the geometric model to programmatically affect deformation of that geometric model. Because the deformation is algorithmically determined SSD techniques are very efficient for the animator and can be computationally efficient. However, the surface geometry tends to collapse as joints are fully bent and it is difficult to give the artist specific control over the final visual representation of the character. The result of SSD often requires significant and time consuming correction performed by artists.

Pose space deformation (PSD) is described in "Pose Space Deformation: A Unified Approach to Shape Interpolation and Skeleton-Driven Deformation" by J. P. Lewis et al., International Conference on Computer Graphics and Interactive Techniques, Proceedings of the 27th annual conference on Computer graphics and interactive techniques (2000) which is incorporated herein by reference. A "pose space" is the space spanned by the variations of all pose controls in a character model. An artist positions a character model at some selected set of pose controls to define an initial model, and then sculpts a deformed pose from that initial model to define a library of sculpted poses. Each sculpted pose can be defined by the initial pose combined with a corrective deformation. A character may have many pre-built sculpted poses to meet the needs of a particular application. In PSD each sculpted pose (e.g., corrective deformation) in the library is associated with a control driver, most commonly joint angles, that define the pose. When animating an arbitrary pose, one or more corrective deformations are selected from the library based upon the similarity between the control joint angle values of the arbitrary pose and the control joint angle values associated with the corrective deformations stored in the library. While joint-angle-based PSD provides good performance, it has been found that a significant amount of additional, labor intensive correction is often required.

Accordingly, a need exists for systems, methods, software and devices for creating and manipulating computer generated characters with improved corrective deformation processes that are procedural, require minimal artistic correction yet provide significant artistic control.

One embodiment relates generally to improved methods for deforming a geometric model when the model is flexed. The corrective deformation processes of some embodiments generally involve using surface information determined from a geometric model to inform animation processes (e.g., software tools). The animation tools are configured in accordance with certain embodiments to use the surface information, gathered from a collection of "sensors" or pairs of distance measurement nodes located on the surface of a geometric model, to control the deformation process. In contrast, SSD techniques use the skeletal model to inform the animation processes that control deformation and PSD techniques use joint angles to inform the animation processes that control deformation. In addition to improved performance, certain embodiments have an advantage in that the surface information is the same information that an animator would use to manually apply free form deformation. Hence, the deformation technique in accordance with certain embodiments can be "artist friendly" in that it is more intuitive for artists to select and manipulate surface information sensors because they are experienced with looking at surfaces as input and feedback in their own manual processes.

FIG. 1 is a block diagram of a computing environment that may be used in conjunction with certain embodiments. In some embodiments, a user 102 (also referred to as an artist, modeler, rigger, poser, animator, or a variety of other titles) interacts via an interface 104 with a processor 106. For example, the interface 104 may be a keyboard, joystick, controller, rollerball, pen and stylus, mouse, camera, keypad, series of buttons, or voice recognition system among other devices and features. The interface 104 may also be a touch screen associated with a display 112. The user may respond to prompts on the display 112 by touching the screen. Textual or graphic information may be entered by the user through the interface 104.

The processor 106 may comprise a single- or multi-chip processor, which may comprise one or more cores on each chip. The processor 106 is configured to send a display signal 110 to the display 112, for viewing by the user 102 and/or other people. The processor 106 is configured to take instructions and/or other data from a storage 114, that is, in some embodiments, pre-configured to contain character modeling data, pose libraries, or other data representative of a character, possible poses for a character, deformations for a character, video relating to the animation of a character, and other useful or necessary data for performance of the embodiments disclosed herein. The storage 114 is configured to communicate with the processor 106 over a bi-directional data path 116.

The processor 106 comprises a plurality of modules 118, 120, and 122. As can be appreciated by one of ordinary skill in the art, each of the modules 118, 120, and 122 comprise various sub-routines, procedures, definitional statements, and macros. Each of the modules 118, 120, and 122 are typically separately compiled and linked into a single executable program. Therefore, the following description of each of the modules 118, 120, and 122 is used for convenience to describe the functionality of the processor. Thus, the processes that are undergone by each of the modules 118, 120, and 122 may be arbitrarily redistributed to one of the other modules, combined together in a single module, or made available in a shareable dynamic link library. Further each of the modules 202-210 could be implemented in hardware. In one embodiment the processor 106 comprises a modeling module 118, a deformation module 120, and a rendering module 122.

The storage 114 comprises electronic circuitry that allows information, typically computer data, to be stored and retrieved. Storage can refer to external devices or systems, for example, disk drives or tape drives. Storage can also refer to fast semiconductor storage (chips), for example, Random Access Memory (RAM) or various forms of Read Only Memory (ROM), that are directly connected to the processor. Other types of storage include bubble memory and core memory. In certain embodiments, the storage 114 comprises a number of data for use by the processor 106 in performing the embodiment. For instance, the storage 114 comprises, in some embodiments, library data 124, which may comprise, in some embodiments, an adjustment library a deformation library, or target poses and associated adjustments (described below with respect to FIG. 11), character model data 126, and rigging data 128.

Figure 2:
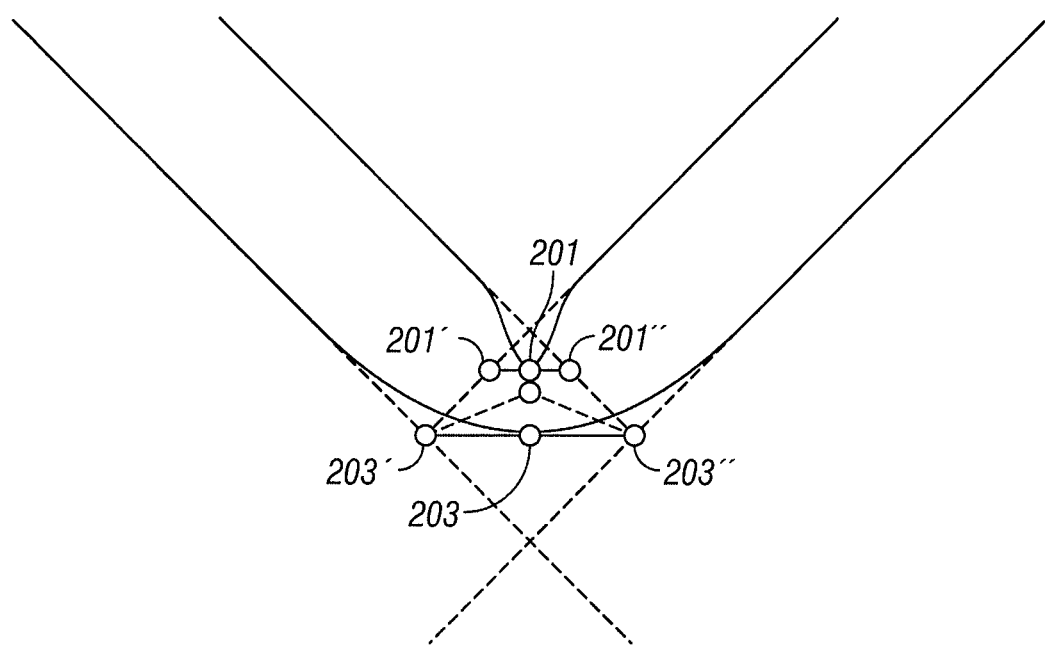
FIG. 2 shows results of a skeletal subspace deformation algorithm in accordance with the prior art.

FIG. 2 shows results of a skeletal subspace deformation algorithm in accordance with a SSD model. The deformed position of a point 201 lies on the line 201'-201". The line 201'-201" is defined by the images 203 of that point rigidly transformed by the neighboring skeletal coordinate 205. This deformation technique results in a characteristic collapsing joint problem shown in FIG. 2.

Figure 3:
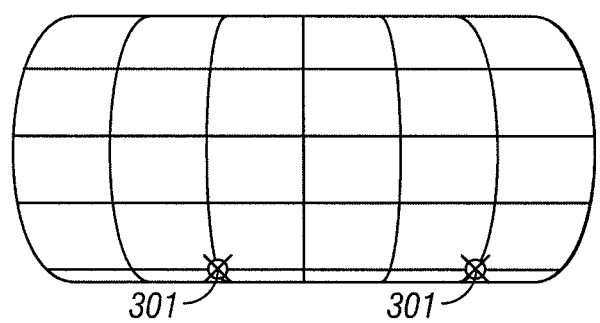
FIG. 3 shows a geometric model represented as a neutral skin mesh of an object.

FIG. 3 shows a geometric model represented as a neutral skin mesh of an object. The geometric model shown in FIG. 3 is a generally cylindrical shape represented as a wire frame mesh. In accordance with some embodiments, distance measurement nodes 301 are added. In some embodiments, multiple distance measurement nodes are located about a surface of a geometric model. In FIG. 3 two pairs of distance measurement nodes 301 are provided with a separation of 4 units indicated in the drawing for reference. The measured distance between points is determined from a local framework of reference.

Precise location of the distance measurement nodes and the distance between them is adaptable to the needs of a particular application and can be selected based on performance achieved with minimal experimentation.

FIG. 4 illustrates the geometric model or mesh of FIG. 3 after repositioning to effect a ninety degree bend. FIG. 4 shows a comparison before corrective deformation on the left and after corrective deformation on the right. The left-hand illustration is similar to the situation shown in FIG. 3, in which, without corrective deformation, the characteristic joint collapse occurs because of the way in which skeletal subspace deformation algorithms operate. On the right-hand side is a geometric model that has been correctively deformed to have a square outer corner, full, non-collapsed inner corners, with some bulging as might occur in an arm bending at the elbow. The deformation that takes place between the left hand illustration and the right hand illustration may be manually applied by an artist using free form deformation (FFD) tools during an initial or phase when a library data 124 is being compiled. Alternatively, the deformation shown in FIG. 4 may be programmatically determined in accordance with certain embodiments by selecting one or more deformations from the library data 124 and programmatically applying them to an initial model such as shown in the left-hand side of FIG. 4.

Figure 5:
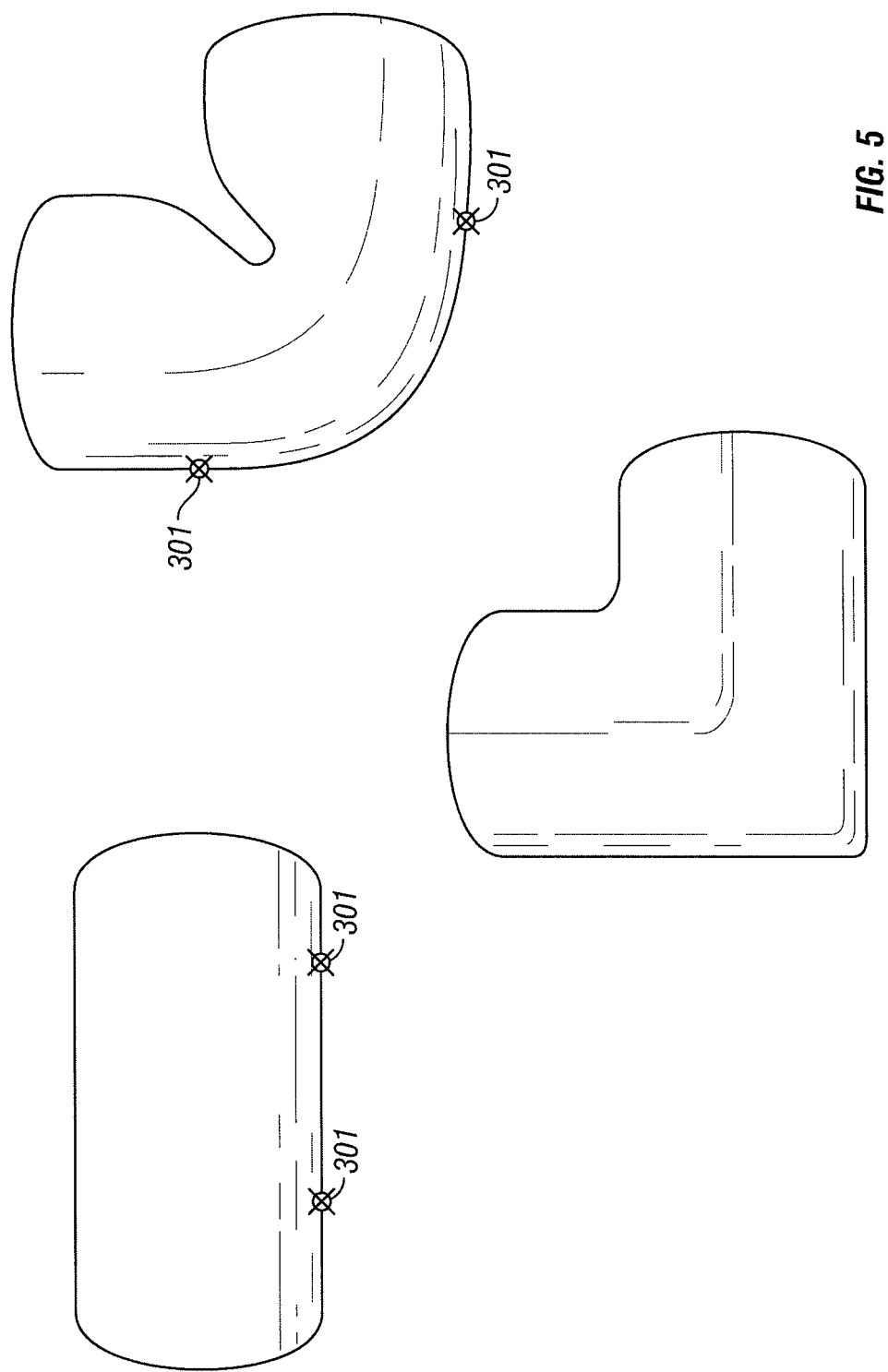
FIG. 5 illustrates objects rendered from the geometric models shown in FIG. 3 and FIG. 3.

As shown in FIG. 4, the application of an appropriate deformation can greatly enhance the visual appearance of the geometric model. This improvement in the appearance is reflected in the rendered version of the models shown in FIG. 5. Because the corrective deformations affect the shape of the geometric model, they also may affect the texture, shading, lighting, coloring, and almost all other processes that are based on the geometric model.

FIG. 6 illustrates geometric model/mesh representations of the model shown in FIG. 3 before (left) and after (right) corrective deformation after squashing. Squashing and stretching are common operations on a computer generated character and point out a particular weakness of SSD and joint-angle-based PSD techniques. SSD uses skeletal position to drive the deformation, but in a squash operation the skeletal position may not change in which case no deformation is triggered. Similarly, the PSD techniques driven by joint angles do not register a change during a squash/stretch operation and so no deformation is triggered. Hence, the result of SSD and joint-angle-based PSD is similar to what is shown in the left hand side of FIG. 6. In accordance with certain embodiments, the distances between distance measurement nodes 301 changes with any stretch/squash operation so the operation can be used to trigger corrective deformations as shown in the right-side of FIG. 6.

FIG. 7 illustrates an object rendered from the geometric models shown in on the left-hand side of FIG. 6 using a joint-angle-based PSD. As discussed above with respect to FIG. 6, the object shown on the left-hand side of FIG. 6 does not display the desired deformation because the skeletal position did not change in the squash transformation. Thus, the rendering of FIG. 7 also fails to show the desired result of the squash transformation.

FIG. 8 illustrates the object shown on the right-hand side of FIG. 6, which displays the desired deformation and is triggered based on the difference in the distance between the distance measurement nodes. As can be seen in FIG. 8, the skin has deformed in an artistically desirable way due to the use of distance measurement node-triggered deformations.

An additional problem with joint-angle-based techniques can arise when an area of the character's surface is influenced by additional joints or other surface deformers. In such situations, there is the possibility that similar or identical poses could result from two or more joint-angle configurations. In those instances, a poser must spend additional time associating the same adjustments with multiple sets of joint angles.

FIG. 9 is a flowchart showing one embodiment of a step for the creation and animation of a character according to one embodiment. In this embodiment an artist first creates a character design at step 910 for a character to be animated. This character design can be a pen-and-ink drawing, a painting, a sculpture, or any other appropriate form. Then, a modeler models the character in 3D at step 920 using appropriate modeling techniques. For instance, the modeler can model the character using NURBS, polygon meshes, wireframes, or other modeling methods and techniques. Then the character model is then passed to a rigger for rigging at step 1000. One example of a process of building a rig is described below with respect to FIG. 10. After a rig is built and applied to the model, the rigged model may be passed to a poser to create a library data 124 at step 1100. One example of a process of creating a library data 124 is described below with respect to FIG. 11. Once the library data 124 is created, the rigged model and library data 124 are passed to animator to animate the character at step 1200. One example of a process of animating a character is described below with respect to FIG. 12. Depending upon the embodiments and the desired result, additional steps may be added, steps may be removed, or the steps may be reordered.

FIG. 10 is a flowchart showing one embodiment of a process to build a rig process. FIG. 10 illustrates one embodiment of a plurality of steps that can occur in step 1000 of FIG. 9. In certain embodiments, the user 102 performs the steps of the flowchart in FIG. 10 by use of the interface 104 (FIG. 1). In certain embodiments, the performance of the build rig step generates rigging data 128 for storage 114 in the computer storage 114 and later use by the rigging module 118.

The character model of step 920 may comprise the rigid topology of the surface of a character. In order to animate such a fixed body, a rigger may, in some embodiments, define functional relationships between the elements of the character. For instance, the rigger may place joints at step 1010 into the character, allowing angular motion between the portions of the character defined by the joint. As discussed above, the joints are associated with rigid rods, or bones, which form a skeleton within the character and define the extent of influence of the joint. In other embodiments, the rigger may use alternate methods for creating a dynamic character from the rigid character model.

Next, at step 1020 of FIG. 10, in order to allow animators to induce such flexion of the joints, in some embodiments the rigger adds controls for animation. Such controls can take on a variety of forms. In some embodiments, handles attach directly to certain portions of the character to allow the animator to manipulate the handles and thus induce flexion in one or multiple joints with a single control action. In addition to adding controls, the rigger skins the character at step 1030, by defining relationships between the joint angles and/or bones and the visible surface or skin of the model. In this way the rigger gives effect to the joints and controls by allowing manipulations thereto to be expressed as movement, flexion, or deformation to the character model.

In certain embodiments, the rigger subsequently creates distance measurement nodes at step 1040, which are located on or associated with specific locations on the surface or skin of the character model. The distance measurement nodes can be of any suitable form, but should provide a constant surface references and the ability to determine distances between pairs of surface points. Certain principles may be used to guide the placement of the nodes. For instance, areas of high deformation (e.g., areas such as necks or elbows, where large movements between large body segments are likely), and areas of high overlap (e.g., areas of the skin that are highly influenced through the character rigging by multiple bones and/or joints) may benefit from a higher density of distance measurement nodes so as to allow the identification of a larger number of distinct poses. However, in certain embodiments it is desirable to limit the number of nodes to the minimum set that provides sufficient resolution in pose space to define an acceptable number of deformations. This is because as the number of distance measurement nodes increases, so does the size of pose space, the number of target poses (described below) needed to create an adequate library data 124, and the processing power needed to perform weighted blends (described below) when posing and animating the character. Depending upon the embodiments and the desired result, additional steps may be added, steps may be removed, or the steps may be reordered.

Figure 11:
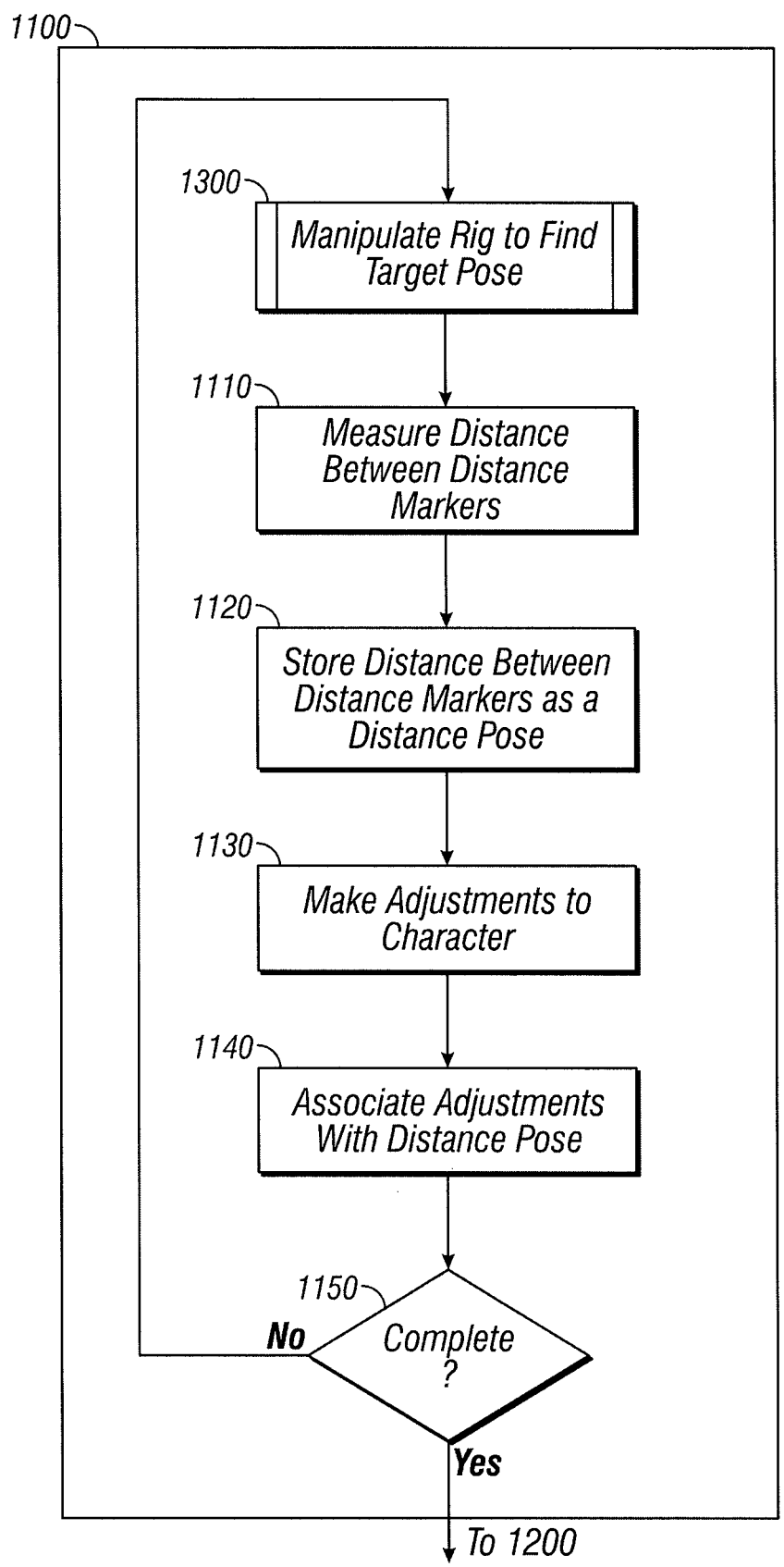
FIG. 11 is a flowchart showing one embodiment of a process to create a library data.

FIG. 11 is a flowchart showing one embodiment of a process to create a library data. FIG. 11 illustrates one embodiment of a plurality of steps that can occur in step 1100 of FIG. 9. In one embodiment, a poser receives a posable character model and creates a library data 124 at step 1100. First, the poser manipulates the rig to find the target pose at step 1300. A purpose for the target pose is to determine a pose of the character model, for which the rigging, skinning, and previous deformations, provide a suboptimal surface configuration. For instance, the suboptimal shape of the surface of the elbow under 90° flexion as discussed above with respect to FIG. 4. After the character is in a target pose, the distance between distance measurement nodes is measured at step 1110. In some embodiments the poser makes a manual measurement, while in others the measurement is automated. The measurement is between one pair of distance measurement nodes, more than one pair of distance measurement nodes, or every pair of distance measurement nodes, depending on the embodiment practiced. In some embodiments, the measurement or measurements may be stored as a single distance pose at step 1120, which may be represented as a point in pose space, a set of measurements, or any other suitable representation. Depending upon the embodiments and the desired result, additional steps may be added, steps may be removed, or the steps may be reordered.

After determining the distance pose for a target pose at step 1130, the poser may make adjustments to the character. In some embodiments the adjustments are solely directed to the topography of the skin of the character model. Such sculpting manipulates the skin from the shape resulting from the previous rigging, manipulations, and deformations into a more desirable form. In other embodiments, the adjustments can also include non-topographical changes to the appearance of the character model such as changes in colors of portions of the character's skin (e.g., when a character squeezes its fingers together, the surrounding skin turns pale), the position of some other feature of the character (e.g., when a cat character arches its back, its fur stands on end), or any other similar manipulation. Such non-topographical changes may be made to the model using standard techniques, including, but not limited to changing shader or hair attributes. Although certain embodiments disclosed herein discuss "deformations," other types of adjustments are usually possible whenever deformations are possible.

In some embodiments, the distance pose and the adjustment are associated with each other in the computer storage 114 for use by the deformation module 120 at step 1140 as part of a library data 124. After the associated pair is stored, the step 1100 can be repeated by returning to step 1300 and performing the subsequent steps until the library data 124 is determined to be sufficiently robust at step 1150. During these iterations, the poser manipulates the character into a number of poses throughout the pose space. In some cases the poser may not be manipulating a complete character model, but instead may manipulate a portion of a character model such as a neck, head, arm, discrete portion of a model. In some embodiments, the poser creates surface distance measurement nodes 301. This involves identifying a number of points on the surface, the distance between which relates to the geometry of the surface of the model.

For a particular pose of the character model or portion thereof, the poser establishes an initial model by selecting values for the pose controls. The initial model may be suitable, in which case no deformation is required. In other cases the initial model is not initially suitable and the artist manipulates various controls, such as free form deformation controls, to generate a visually suitable model. The step of manually deforming a model may be referred to as sculpting the initial character model portion to define a sculpted character model portion. Deformation may be computed where the deformation describing a deviation between the initial model and the sculpted model at the particular pose. In other words, a deformation is a mathematical description of the difference between the shape shown on the right side of FIG. 4 and the left side of FIG. 4, or a mathematical description of the difference between the shape shown on the right side of FIG. 6 and the left side of FIG. 6. A variety of algorithms may be used to computing deformations in such embodiments, such as a mean blending, a Gaussian blending, a selection of the closest match or other known algorithms.

The deformation can be stored in a storage 114 with the number of distance values for each of the pairs of distance measurement nodes 301 in the particular pose. In this manner the distance values uniquely identify a particular pose based on the surface state achieved by that pose, but not directly dependent on the skeletal position, joint position, or sequence of skeletal/joint movements taken to get to a particular pose. As a result, the library data 124 can be indexed by the distance value or values and particular deformations can be selected from the library data 124 during synthesis mode operation to identify the most appropriate deformations for a particular arbitrary pose.

Figure 12:
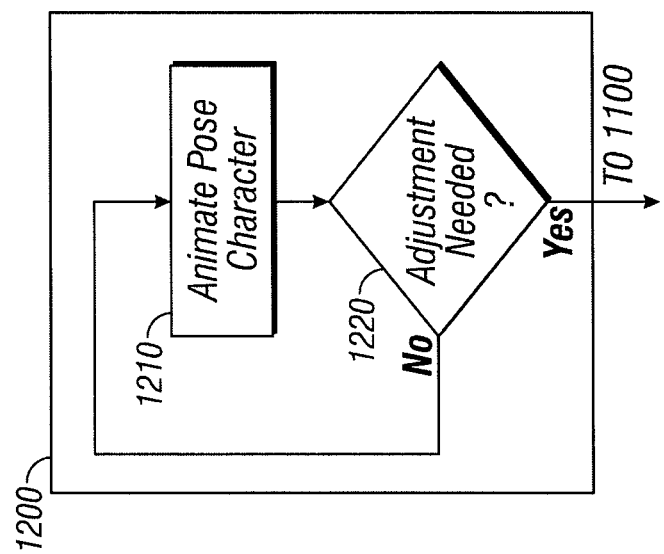
FIG. 12 is a flowchart showing one embodiment of a process to animate a character.

FIG. 12 is a flowchart showing one embodiment of a process to animate a character. FIG. 12 illustrates one embodiment of a plurality of steps that can occur in step 1200 of FIG. 9. Depending upon the embodiments and the desired result, additional steps may be added, steps may be removed, or the steps may be reordered. After the character has a suitable library data 124, an animator animates the character at step 1200. The animator adjusts the pose of the character at step 1210 in much the same way as the poser, in order to set suitable keyframes for a final video. During the course of the animation, the animator may judge in some embodiments whether an adjustment to the character is needed at step 1220. If the animator determines that an adjustment is needed, the animator may optionally send the character model data 126 and library data 124 back to the rigger at step 900 for further adjustment.

Figure 13:
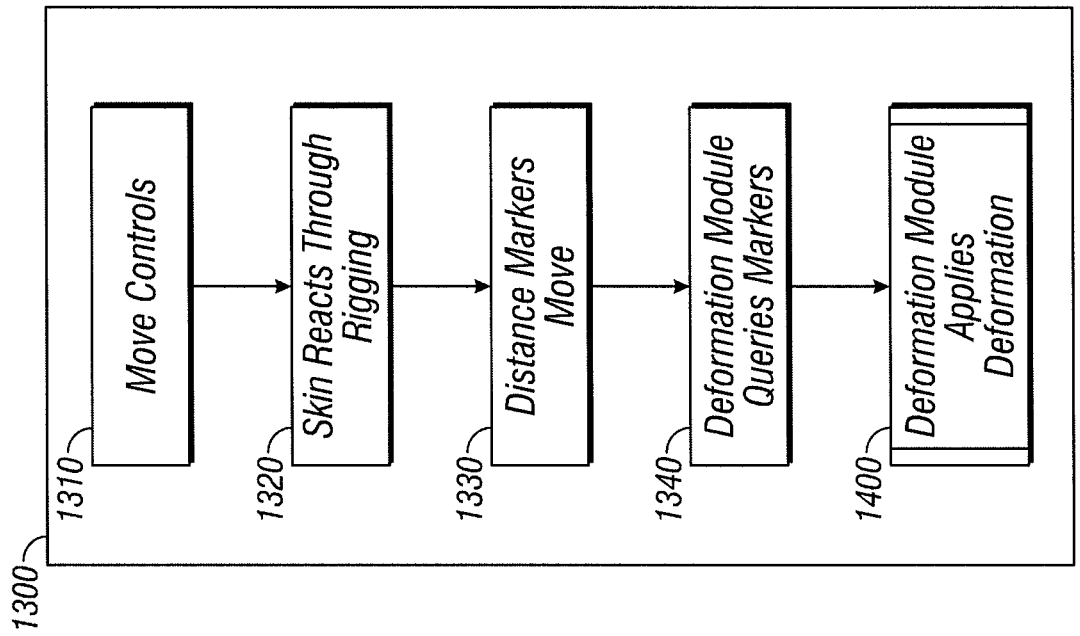
FIG. 13 is a flowchart showing one embodiment of a process to manipulate a rig to find a target pose.
Figure 14:
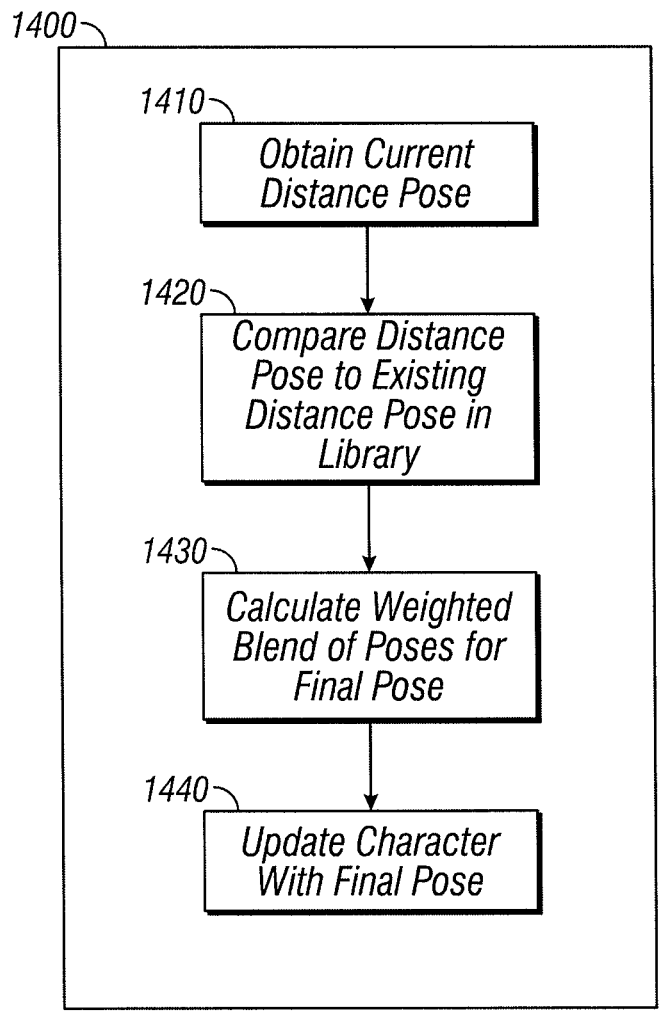
FIG. 14 is a flowchart showing one embodiment of a process to apply a deformation to a character.

FIG. 13 is a flowchart showing one embodiment of a process to manipulate a rig to find a target pose. FIG. 13 illustrates one embodiment of a plurality of steps that can occur in step 1300 of FIG. 9. Depending upon the embodiments and the desired result, additional steps may be added, steps may be removed, or the steps may be reordered. While the poser is creating a library data 124, and while the animator is animating the character at step 1200, certain steps are occurring in a computer processor 106 to present a representation of a character to the artists on a computer display 112. In order to manipulate the rig to find a target pose at step 1300, the poser first moves the character's controls at step 1310, or otherwise changes the pose of the character. In response to the movement of the controls, the skin reacts at step 1320, by moving in the way prescribed by the rigging. As a programmatic result, the distance measurement nodes, which are attached to locations on the skin move with the skin at step 1330, or move in another prescribed way. The deformation module 120 queries the distance measurement nodes at step 1340 to determine the position of each distance measurement node. Then the deformation module 120 applies a deformation to the character at step 1400. FIG. 14, set forth below, illustrates one embodiment of a process for applying this deformation.

FIG. 14 is a flowchart showing one embodiment of a process to apply a deformation to a character. FIG. 14 illustrates one embodiment of a plurality of steps that can occur in step 1400 of FIG. 9. The application of a deformation module 120 at step 1400, comprises, in some embodiments a series of steps. At step 1410, the deformation module 120 determines the current distance pose from the positions of the distance measurement. Next, at step 1420, the deformation module 120 compares the current distance pose with one or more known distance poses in the library data 124. Next the deformation module 120 determines a weighted blend of poses from the library data 124 at step 1420 based on the comparison and a predetermined algorithm. In various embodiments, the weighted blend may comprise a closest match, a blend weighed by linear distance, a blend weighted by a Gaussian distance function, or a blend based on any other available algorithm. Once the weighed blend is determined, the deformation module 120 updates the character by applying a deformation corresponding to the weighted components of the determined final pose at step 1440. Depending upon the embodiments and the desired result, additional steps may be added, steps may be removed, or the steps may be reordered.

Certain embodiments may be thought of as operating in a calibration or library generation phase and an operational phase in which a previously generated library data is consulted to synthesize deformation for arbitrary poses of a computer generated character. In the library generation phase a poseable character model is assumed to already exist. The character model comprises, for example, a skeleton and geometric models associated with the skeleton along with pose controls. The artist is able to manipulate the model pose by controlling the pose controls. Certain embodiments are readily adapted to a wide variety of computer graphic and character representation techniques and software. In fact, because certain embodiments involve surface-based information of the animation processes it may be particularly adaptable because it does not rely on the existence of a skeletal framework or any particular control technique in order to operate. Along with other benefits, certain embodiments resolve the problems of stretching and squashing transformations which affect the model without changing the joint angles. Moreover, certain embodiments eliminate redundant posing operations compared to joint-angle-based deformation systems because certain embodiments use the shape of the surface of the skin rather than the angles between joints.

Certain of the embodiments described above portray the distance measurement nodes as 0-dimensional points, which are bound to the skin. In other embodiments, the distance measurement nodes may comprise other shapes. For instance, in some embodiments the distance measurement nodes are lines, such as longitude lines, and distance poses comprise information about the distance and or curvature of the lines on the model. In other embodiments, distance measurement nodes may comprise two-dimensional swaths of area on the surface of the character. In yet other embodiments, any other measurement node that allows for analysis of the position of at least some areas of the skin in order to create distance poses for use in selecting a deformation.

Although certain embodiments are described and illustrated with a certain degree of particularity, it is understood that the present disclosure has been made by way of example, and that numerous changes in the combination and arrangement of parts can be resorted to by those skilled in the art without departing from the spirit and scope of the application, as hereinafter claimed. Although some steps may be described throughout this document as occurring in a particular order, in various other disclosed embodiments, the steps may occur in any workable or logical order consistent with the spirit and scope of this application. Although some steps are described as performed by separate actors, any combination of people or an individual may perform the various tasks needed to practice the embodiments disclosed herein. Further, even though certain steps are described in terms which may be read to imply the use of specific programming languages or conventions (e.g., object-oriented, functional) the disclosure is not limited to embodiments employing those languages or conventions.

What is claimed is:

1. A method comprising:
    modeling a deformable object using an electronic device, the deformable object being configurable into one of a plurality of different surface configurations corresponding to different poses of the deformable object, and wherein a model comprises at least two of the plurality of different surface configurations, wherein each of the surface configurations in the model is associated with one of two or more first surface geometries in the model, wherein each of the surface configurations is identified by a set of distance measurements defined by two or more surface locations on each of the surface configurations;
    receiving a selection of a pose for the deformable object;
    determining, based on the selected pose, a second surface geometry for a surface configuration of the deformable object, wherein the second surface geometry is not in the model, and wherein the determining applies a shape interpolation to the two or more first surface geometries in the model, wherein the shape interpolation includes a weighted shape blend of the two or more first surface geometries chosen based on the distance measurements; and
    animating the deformable object to display the second surface geometry without displaying the two or more first surface geometries.

2. The method of claim 1, wherein at least one of the two or more first surface geometries in the model comprises a deformation to a shape of at least a portion of the surface configuration of the deformable object.

3. The method of claim 1, wherein at least one of the two or more first surface geometries in the model comprises a modification to a color of at least a portion of the surface configuration of the deformable object.

4. The method of claim 1, wherein the deformable object comprises a character configured for animation by manipulation of a skeleton.

5. An electronic device comprising:
    a memory storing a model including at least two of a plurality of different surface configurations of a deformable object, the plurality of different surface configurations corresponding to different poses of the deformable object, wherein each of the plurality of different surface configurations in the model is associated with one of two or more first surface geometries in the model, wherein each of the plurality of different surface configurations is identified by a set of distance measurements defined by two or more surface locations on each of the plurality of different surface configurations;
    a processor configured to execute animation instructions by:
        receiving a selection of a pose for the deformable object;
        determining, based on the selected pose, a second surface geometry for a surface configuration of the deformable object, wherein the second surface geometry is not in the model, and wherein the determining applies a shape interpolation to the two or more first surface geometries in the model, wherein the shape interpolation includes a weighted shape blend of the two or more first surface geometries chosen based on the distance measurements; and animating the deformable object to display the second surface geometry without displaying the two or more first surface geometries.

6. The electronic device of claim 5, wherein at least one of the two or more first surface geometries in the model comprises a deformation to a shape of at least a portion of the surface configuration of the deformable object.

7. The electronic device of claim 5, wherein at least one of the two or more first surface geometries in the model comprises a modification to a color of at least a portion of the surface configuration of the deformable object.

8. The electronic device of claim 5, wherein the deformable object comprises a character configured for animation by manipulation of a skeleton.

9. A method for use by an electronic device having a processor and a memory storing a model including at least two of a plurality of different surface configurations of a deformable object, the plurality of different surface configurations corresponding to different poses of the deformable object, wherein each of the plurality of different surface configurations in the model is associated with one of two or more first surface geometries in the model, wherein each of the plurality of different surface configurations is identified by a set of distance measurements defined by two or more surface locations on each of the plurality of different surface configurations, the method comprising:

receiving a selection of a pose for the deformable object;

determining, based on the selected pose, a second surface geometry for a surface configuration of the deformable object, wherein the second surface geometry is not in the model, and wherein the determining applies a shape interpolation to the two or more first surface geometries in the model, wherein the shape interpolation includes a weighted shape blend of the two or more first surface geometries chosen based on the distance measurements; and animating the deformable object to display the second surface geometry without displaying the two or more first surface geometries.

10. The method of claim 9, wherein at least one of the two or more first surface geometries in the model comprises a deformation to a shape of at least a portion of the surface configuration of the deformable object.

11. The method of claim 9, wherein at least one of the two or more first surface geometries in the model comprises a modification to a color of at least a portion of the surface configuration of the deformable object.

12. The method of claim 9, wherein the deformable object comprises a character configured for animation by manipulation of a skeleton.

* * * * *